Patented May 4, 1954

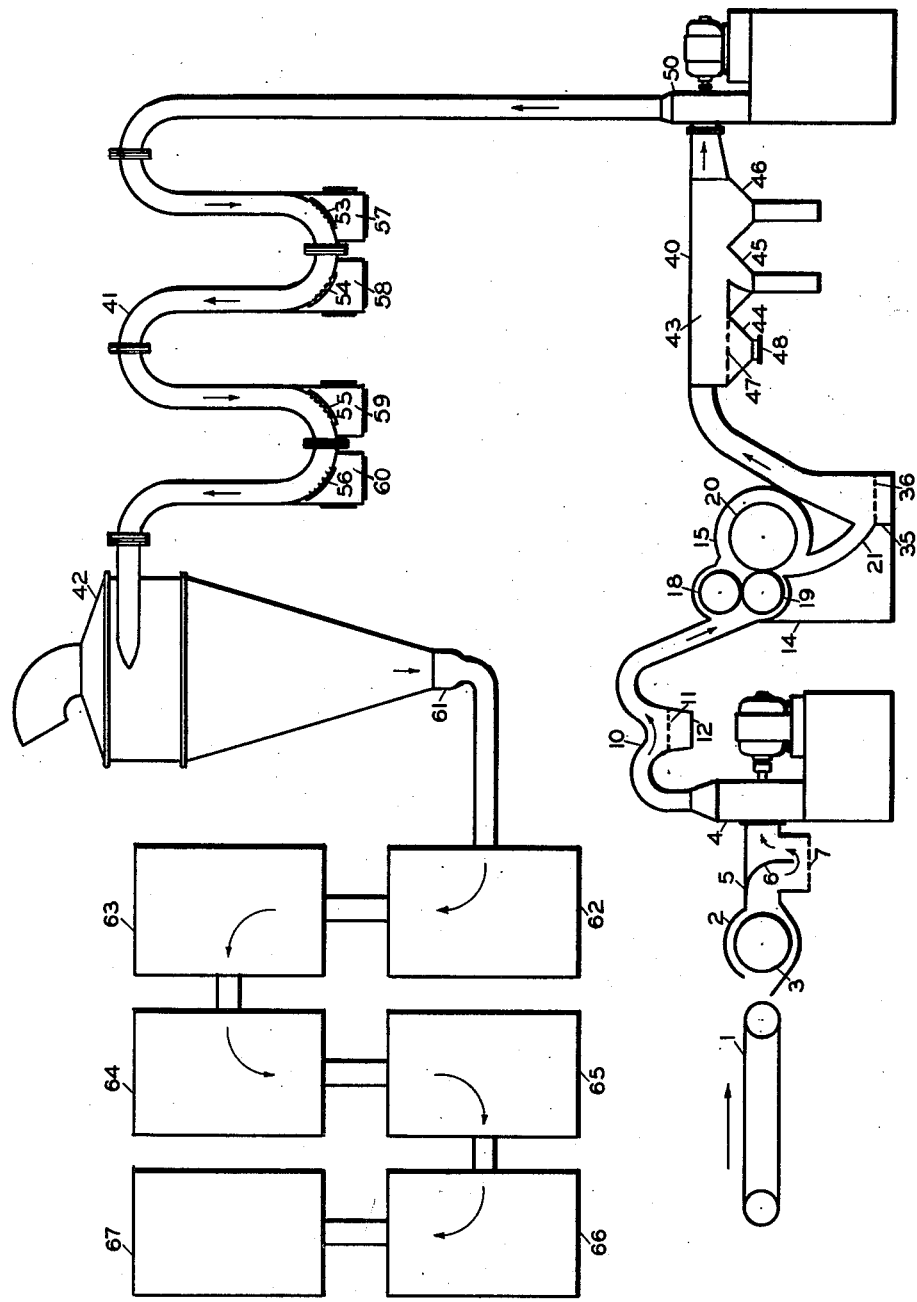

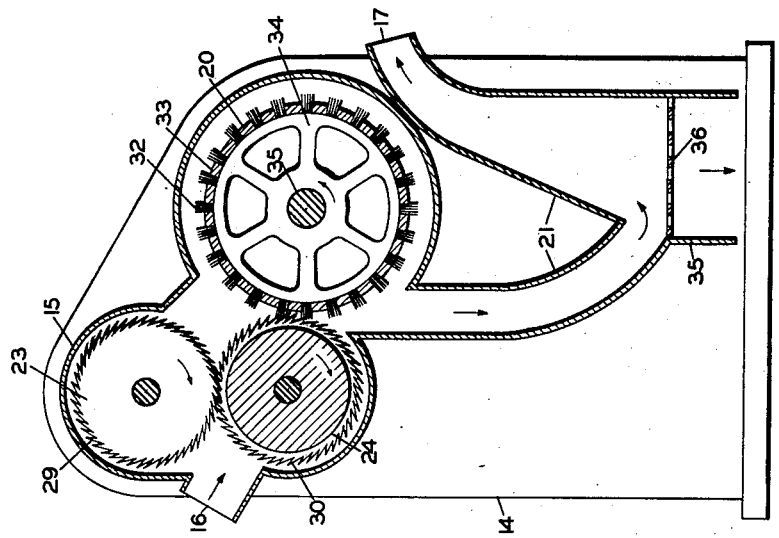
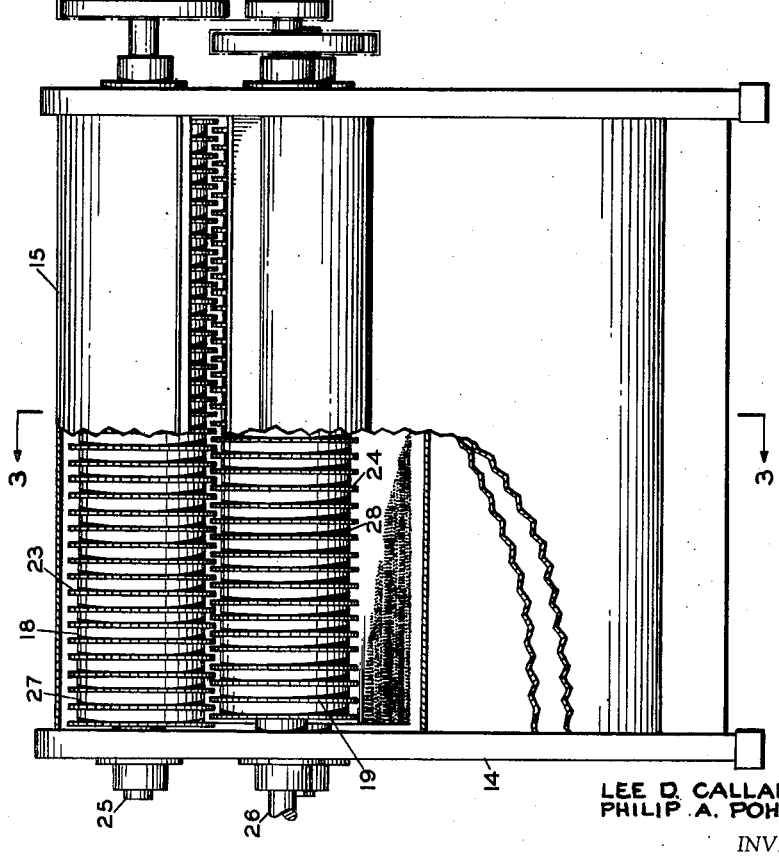

2,677,153

UNITED STATES PATENT OFFICE 2,677,153

PREPARATION OF CELLULOSE DERIVATIVES

Lee D. Callans, New York, N. Y., and Philip A. Pohlke, Hopewell, Va., assignors to Hercules Powder Company, Wilmington, Del., a corporation of Delaware Application January 14, 1947, Serial No. 722,064

2 Claims. (Cl. 19—76)

This invention relates to the purification of cellulose materials and more particularly to an improved process and apparatus for purifying cellulosic materials to produce cellulose derivatives, such as for example, cellulose acetate, having improved color, haze and filterability characteristics.

Purified cotton cellulose used in the preparation of high quality cellulose derivatives such as cellulose esters and ethers generally has been of cotton linters origin; i. e., the fuzz fibers remaining on the cottonseed after the removal of the longer lint fibers by the ginning process. These fibers carry on their interior (on the canal or lumen surface) and also as an outside covering or membrane, certain waxes and other noncellulosic and difficultly disintegrated materials. In addition to the noncellulosic material constituting a part of the cotton linter fiber, portions of seed shells, dirt and other extraneous matter are generally present and mixed with the cotton linters.

Purification of cotton linters has generally been carried out by a process involving digestion with caustic soda, at an elevated temperature and under superatmospheric pressure, followed by washing, bleaching with dilute aqueous hypochlorite solution, washing and drying, and with or without substantial preliminary mechanical cleaning. Where preliminary mechanical cleaning is not used, substantially all of the contaminants of the linters fibers must be removed by chemical modification and/or solution. However, processes of this type known to the art possess certain disadvantages. For example, when the conditions or treatment are drastic enough to eliminate all the contaminants, the cellulose is also degraded partially, with consequent modification of properties and a decrease in yield. On the other hand, conditions sufficiently mild not to affect the cellulose, also fail to eliminate completely the contaminants with consequent adverse effects on cellulose derivative quality.

Mechanical cleaning, when used, has generally been accomplished by subjecting the cotton linters to various separating and screening devices while carried in a stream of air. Typical devices of this kind are shown in the patents to Meyers et al. (U. S. 1,312,798), Garrett (U. S. 2,076,983), and Schwartz et al. (U. S. 2,274,385). The Meyers patent covers an inertial cleaner using a screened surface at small radius and including reversal of direction. The Garrett patent covers a cyclone separator equipped with a wire screen installed in such a manner that the fibers are "scrubbed" over the screen surface and fine impurities are removed. The Schwartz patent covers a multipass linters cleaner using conventional linters screening elements for the removal of fine contamination and using air separation in gravity chutes for the separation of a small amount of contamination of large size from the linters furnish.

However, after combinations of these various treatments have been carried out upon a given sample, a certain proportion of the undesirable components such as fiber fragments, immature fibers, hull and bran residues, boll, stalk and leaf particles and other miscellaneous impure or semicellulosic particles still remain and pass on to the subsequent stages of treatment, causing inferior cellulose quality and consequent inferior cellulose derivatives prepared from such material. It is therefore essential that the cleaning operation be so coordinated with the subsequent operations of digesting, washing, bleaching, etc., as to produce a cleaned linters furnish which may be processed to give purified cellulose and cellulose derivatives of the desired quality and characteristics.

Now it has been discovered that cellulose derivatives having improved color and filterability may be produced from cotton linters or other similar material by a process which consists of dispersing the raw linters in a stream of air, passing the stream of air dispersed linters through restricted openings formed between cooperating saw tooth discs of a saw tooth opener to further open up and separate the linters, subjecting the stream of air-dispersed, opened-up linters to a cleaning action to separate out more dense particles; purifying the separated linters by the usual alkali digestion and subsequent bleach operations and then acetylating by a usual acetylation method. By first dispersing the linters in a stream of air and then further dispersing and opening them up by the saw tooth opener of this invention, while still suspended in air, it is possible to obtain a very finely dispersed material which lends itself readily to mechanical cleaning and separation of the undesirable components as well as to the subsequent chemical treatment, the opened up and finely dispersed condition of the fibers permitting intimate contact with the chemicals used with resulting uniformity and completeness of reaction.

A preferred embodiment of the invention has been chosen for purposes of illustration and description and is shown in the accompanying drawings forming a part of the specification wherein: Figure 1 is a diagrammatic view of an apparatus for carrying out the various steps of the process; Figure 2 is a front elevational view of the novel saw tooth opener shown at 14 in Figure 1 and with a portion of the housing broken away to show more clearly the saw cylinders and brush roll; and Figure 3 is a sectional view of the saw tooth opener taken on line 3—3 of Figure 2.

Referring to Figure 1 raw cotton linters from any suitable source are fed at a uniform rate to the feed belt 1 of cotton picker 2. The feed belt 1 carries the lumps of compressed linters against the rotating spiked roll 3 of the picker 2 which partially disperses and fluffs the compressed linters. As the fluffed linters are expelled from the picker roll they are caught in the suction air current of the conveying fan 4 and drawn through a separator 5 having a downwardly extending curved baffle 6 and a perforated bottom plate 7. As the lumps of fibers are impinged against the perforated plate 7, contaminants are expelled through the perforations thereof, the light fibrous material being kept in suspension by the air entering the fan suction through the perforations.

From the container 5 the fibers are carried through the conveying fan 4 to an inertial trap 10. This device incorporates a short radius change in direction of flow of the fiber laden air stream over a perforated plate 11 which may be of any suitable type and construction. Desirably, it is of the type known as machine guard metal which has openings of approximately one-half inch diameter staggered on a spacing of approximately five-eighths of an inch. The bottom of the trap 10 below the perforated plate is preferably sealed by a slidable closure gate 12 which is operated at suitable intervals to remove the material which has been separated from the fibers.

From the trap 10 the partially dispersed linters are carried in the air stream to the novel saw tooth opener 14. Referring more particularly to Figures 2 and 3 the device 14 comprises a horizontal housing 15 provided with lateral inlet and outlet openings 16 and 17, respectively, a pair of superposed saw cylinders or rolls 18 and 19 rotatably mounted in the housing 15 adjacent the inlet 16, and a rotatable brush roll 20 for removing the fibrous material from the teeth of the lower saw cylinder 19 and blowing the opened up fibers through a curved outlet passage 21 connected to the outlet opening 17.

The saw cylinders 18 and 19 are substantially alike in construction and comprise a plurality of discs 23 and 24 mounted on shafts 25 and 26 and held in spaced apart relationship by means of spacers 27 and 28. The discs 23 and 24 are provided with saw teeth 29 and 30 inclined in the direction of rotation of the discs. The saw cylinders are mounted one above the other in closely adjacent relationship and in a manner such that the saw teeth of the upper cylinder project into the spaces between the saw teeth of the lower cylinder and vice versa, thus forming restricted openings between adjacent saw teeth and between the outer edges of the saw teeth and the outer circumference of the spacer members for the passage of the fibers. Rotation of the rolls is effected by any suitable means and in a manner such that the upper roll preferably rotates in the same direction as the lower roll and at a lower peripheral velocity. There is thus provided a high differential in speed between the saw teeth on the upper and lower rolls, which together with the closely intermeshing relationship of the saw teeth on the upper and lower rolls, forming the restricted openings as aforesaid, produces considerably better dispersion and opening up of the linters than has hitherto been possible. Peripheral velocities of about 1880 to about 2200 feet per minute for the upper roll and about 3140 to about 3300 feet per minute for the lower roll are preferred but are not critical. Where higher or lower velocities are utilized it is desirable to maintain a substantially similar speed differential.

The brush roll 20 comprises a plurality of brushes 32 mounted in a drum 33 rotatably supported by the spiders 34 and shaft 35. The peripheral velocity of the roll 20 is preferably from about 500 to about 1500 feet per minute faster than the peripheral velocity of the lower high-speed roll so that the brushes 32 may effectively doff the fibers from the saw teeth of the lower cylinder and propel them into the stream of air passing through the outlet passage 21. Such speeds are not critical, however, and may be increased or decreased without departing from the scope of the invention.

The outlet passage 21 curves downwardly to a lower discharge passage 35, covered by a perforated plate 36, and then upwardly to the outlet opening 17.

In operation the air stream from the fan 4 carries the partially dispersed cotton linters through the inlet opening 16 and feeds them against the rotating saw cylinders 18 and 19. The inclined teeth of the lower high speed roll carry the fibers between the rolls while the upper roll acts as a levelling roll and rotates in a direction such as to result in a kicking or levelling action tending to propel any excess linters back into the feed chute. Since the opening between saw teeth and saw spaces is restricted in size, the linters fibers carried through the opener are broken into very small groups of fibers or even into individual fibers. The dispersed fibers are then removed from the high speed roll by means of the rotating brush roll 20, propelled into the air stream leaving the opener, and carried through the passage 21 to the outlet 17.

The cooperating action of the high speed saw cylinders and brushing roll produce a highly dispersed stream of cotton linters fibers diluted and entrained in air. This condition is most favorable for the separation of contaminants from the fibers and hence as they are carried through the curved outlet passage 21 and impinge against the perforated plate 36 separation of the heavier contaminants, such as cottonseed hull fragments and shale, from the fibers takes place.

After leaving the saw tooth opener the highly dispersed stream of fibers is passed through a series of cleaners and separators comprising a gravity separating chamber 40, a serpentine duct 41 and a cyclone separator 42. By virtue of the highly dispersed state of the fibers these cleaning and separating devices very effectively remove the remaining contaminants such as cottonseed hull fragments and bran, shale, short fibers, etc., so that the resulting material is in a highly satisfactory state for further processing.

The gravity separating chamber 40 consists of an expansion chamber 43 divided into three separate sections 44, 45 and 46, one succeeding the other in a horizontal direction. The first section 44 contains a perforated bottom plate 47 suspended over a sealed hopper bottom 48. The linters are "scrubbed" over the perforated plate and the heavy impurities drop into the sealed hopper from which they are periodically withdrawn. The two succeeding sections 45 and 46 are "moting" openings through which air is admitted and cottonseed hull fragments dropped out of the system. The gravity separating chamber 40 is maintained under slight negative pressure by means of the conveying fan 50 which discharges the air dispersion of linters to the serpentine duct 41.

The serpentine duct 41 is made to incorporate two 180 degree short radius turns and is provided with screen members 53, 54, 55 and 56 at the bends of the duct. The screens may be of any suitable construction but are desirably sixteen mesh wire cloth backed up with perforated plate for strength. Closed receptacles 57, 58, 59 and 60 beneath the screen members provide for the collection of contaminants. If desired, suitable toothed plates may be inserted at each flange of the serpentine duct as a further aid in effecting separation of contaminants.

From the serpentine duct 41 the fiber laden air stream enters the cyclone separator 42 in which the cotton fibers are condensed and discharged at 61. This device may be any well-known type of cyclone separator generally used for this purpose.

The cleaned and opened up linters from the cyclone separator 42 are then passed through the subsequent stages of purification treatment including digesting, washing, bleaching, washing, drying and acetylating which are diagrammatically represented by the squares 62, 63, 64, 65, 66 and 67 of Figure 1. Such treatments may be any of those well known in the prior art.

Having described the particular method and apparatus used for carrying out the invention, the following example is given to illustrate the improved results obtained thereby. In treating the materials reported in the example each sample was passed through the cleaning stage of the process and apparatus the number of times indicated before being passed through the subsequent stages of digesting, washing, bleaching, etc.

EXAMPLE

Several samples of untreated cotton linters varying in size from about 60 to 75 pounds were passed through the cleaning system, designated by the numerals 1—61 in Figure 1, the number of times indicated in the table below. The cleaned linters were then digested in caustic soda solution for about three hours at elevated temperature and superatmospheric pressure. Thereafter the digested linters were washed free of sodium hydroxide and subsequently subjected to a multistage bleaching process. The bleaching process consisted of treating, at a low linters consistency, with a series of dilute solutions of available chlorine (as hypochlorite) in conformance with a fixed schedule as to duration of treatment, concentrations of reagents, temperature, etc., and selected from the art. The linters were then washed thoroughly to remove remaining salts and solubilized noncellulosic material, and subsequently dried.

A superior cellulose acetate was obtained by acetylation of the linters purified as described above. The purified linters were converted into cellulose acetate by a method substantially as described in U. S. Patent No. 1,683,347. Color, opacity and filterability measurements were made on the cellulose acetate and cellulose acetate plastics made from the linters treated in accordance with this invention, and compared with corresponding values of a cellulose acetate prepared from linters of the same quality and by substantially the same procedure, except that the cleaning step did not include the use of the inertial trap 10, the saw tooth opener 14, the cleaning chamber 40 or the serpentine duct 41.

Color and opacity measurements were made on molded discs of the material utilizing molding temperatures over a range up to about 200° C. and times up to about 1 hour. Opacity measurements were made with a photometer and color measurements with a color grader. Measurements in each case were comparative, lower values indicating better color and opacity characteristics of the material.

Filterability values give an indication of the amount of insoluble material in the cellulose derivative and are based on the mass of cellulose derivative that will pass through a unit area of a given filter under specified conditions before flow ceases. Higher values indicate better filterability characteristics and less insoluble material.

The following is a tabulation of the results, samples 2–6 being processed in accordance with the teachings of the invention and sample 1 by omitting the inertial trap, saw tooth opener, cleaning chamber and serpentine duct.

Table

| | | Test Cake | | Medium Temp. Molding Powder Color | High Temp. Molding Color | Filter Test |
|---|---|---|---|---|---|---|
| | No. of Passes | Low Temp. Molding Color | Low Temp. Molding Opac. | | | |
| Sample 1 | 1 | 2.6 | 1.04 | 4 | 2 | 6.7 |
| Sample 2 | 10 | 2.6 | 1.41 | 4 | 1.5 | 11.9 |
| Sample 3 | 4 | 1.6 | 1.05 | 2.5 | 0.5 | 14.2 |
| Sample 4 | 6 | 1.9 | 1.08 | 3 | 0.5 | 22.0 |
| Sample 5 | 6 | -------- | 1.01 | 3 | 0.5 | 21.6 |
| Sample 6 | 2 | 2.4 | 1.0 | 5.5 | 0.25 | 27.0 |

The tabulated results indicate that the four pass sample had the best low temperature color (1.6) of any of the cotton cellulose samples tested. The value of 1.9 for the six pass sample was very good. However, the values of 2.6 for the ten pass sample and 2.4 for the two pass sample were in the range of the value of 2.6 for sample 1. All of the values of the plastic cakes for low temperature molding opacity were good though close to the value of 1.04 for sample 1. It is to be noted that the four pass sample shows the best quality in low temperature color, samples cleaned either more or less showing higher color. This is illustrative of the principle that there is an optimum amount of cleaning for raw cotton cellulose destined for manufacture into cellulose derivatives and particularly cellulose acetate, over-cleaning as well as undercleaning causing retrogression in product quality.

The medium temperature molding powder color has about the same pattern as that established for the plastic cake color, the value of 2.5 for the four pass sample being the lowest shown. The ten pass sample and sample number 1 are at about the same level with values of 4.

The high temperature stability test characteristics, as shown by the high temperature molding colors, indicate that samples 2 to 6, treated in accordance with the teachings of the invention, were better than sample 1. The filter test results likewise indicate an improvement.

The present invention, therefore, comprises dispersing the raw linters in a stream of air, further dispersing and opening up the linters by passing the fiber-laden air stream through the novel saw tooth opener of this invention, subjecting the stream of finely dispersed fibers to one or more cleaning operations and then digesting the cleaned fibers in caustic soda followed by washing, bleaching, washing, drying and acetylating.

As shown and described the cleaning system of the present invention comprises a picker 2, separator 5, inertial trap 10, saw tooth opener 14, cleaning devices 40, 41 and 42 and fans 4 and 50. When utilized as hereinbefore described this system cleans the cotton linters in a manner such that they may then be processed in the usual way to produce an improved cellulose derivative. Although preferred, it should be realized that the system may be modified in certain respects without departing from the scope of the invention. For example, the cleaning chamber 40 and serpentine duct 41 may be eliminated or replaced by other types of cleaners and/or separators. Likewise the devices 5 and 10 may be eliminated or modified. Also, the number of times the material is successively passed through the cleaning system may be varied as desired. It has been found, however, that optimum results are obtained when four passes are made and that increasing or decreasing the number of passes to any considerable extent is likely to result in overcleaning or undercleaning with consequent decrease in product quality.

The most important factors effecting the cleaning of the linters are (1) dispersing the linters in an air stream, (2) further dispersing and opening up the linters by passing the fiber-laden air stream through the saw tooth opener, and (3) separating the contaminants from the finely dispersed suspension of linters in air.

Digestion of the cleaned linters may be carried out with 2.5% sodium hydroxide at temperatures ranging from substantially above the normal boiling temperature of the solution to about 400° F. and under pressure corresponding to the saturated steam pressure of the corresponding temperature. The digestion may be performed in the presence of from about 0.4% to about 1.2% of a suitable detergent, based on the weight of the cooking solutions.

Bleaching of the cotton linters may be in accordance with any of the bleach combinations that are well known such as those involving treatments with alkaline and acid solutions of available chlorine, such as free chlorine, hypochlorites, and chlorites; peroxides such as hydrogen peroxide and sodium peroxide, etc.

The cellulose derivatives, such as the cellulose acetates, may be prepared from the purified linters by methods well known in the arts such as, for example, in U. S. Patents Nos. 1,683,347 and 2,126,190.

In accordance with the process and apparatus of the present invention it is possible to produce a finely dispersed cotton linters fraction free of cottonseed hull and other contaminants. This fraction may then be processed in the usual way to produce a cellulose derivative having improved color, haze, and filterability characteristics. Such derivatives have important uses in industry. For example, the improved color of cellulose acetate made in accordance with the invention renders this material particularly advantageous in the making of clear sheets and moldings used for transparent enclosures, windshields, and similar devices. Improved filterability is particularly advantageous in the manufacture of acetate rayons and extruded sheets and rods, and is an aid in the manufacture of conventionally molded materials, for it prevents some clogging of orifices and nozzles.

The improvement in cellulose derivative quality obtained in accordance with the present invention is attributed to the opened and finely dispersed condition of the cotton linters produced in the manner set forth, the improved cleaning and removal of contaminants made possible by the dilute suspension of cotton linters in air so produced, and the increased uniformity, completeness and efficiency of the reactions of the subsequent purification steps of digesting, washing, bleaching, etc., made possible by the use of the cleaned and finely dispersed cotton linters fraction.

Although the invention has been described with particular reference to the purification of cotton linters to produce cellulose acetate, it will be apparent that it has wider application to the purification of other fibrous materials such as wool, synthetic fibers and similar material and to the production of other cellulose derivatives, such as nitrocellulose, and other end products.

What we claim and desire to protect by Letters Patent is:

1. Apparatus for opening, dispersing and cleaning a fibrous material of the nature of cotton linters having in combination means for dispersing the fibrous material in air and for passing said material to an opening and dispersing device comprising a pair of rotatable rolls provided with spaced saw tooth discs, means for mounting the rolls in parallel adjacent relationship so that the saw tooth discs of the upper roll project into the spaces between the saw tooth discs of the lower roll to form restricted passages therebetween, a rotatable brush roll in parallel adjacent relationship to the lower roll for doffing the fibrous material from the lower roll into a passage extending downwardly and then upwardly, said passage having a perforated member disposed at the bottom thereof, said perforated member being in substantial alignment with and in juxtaposition to the rotatable brush roll to cause said rotatable brush roll to directly impinge the doffed material against the perforated member with increased velocity and the heavy contaminants pass therethrough and are separated from the opened and dispersed material, and exit means for the upwardly extending portion of the passage through which the opened, dispersed and cleaned fibrous material is passed from the apparatus.

2. Apparatus for opening, dispersing and cleaning a fibrous material of the nature of cotton linters having in combination means for dispersing the fibrous material in air and for passing said material to an opening and dispersing device comprising a pair of rotatable rolls provided with spaced saw tooth discs, means for mounting the rolls in parallel adjacent relationship so that the saw tooth discs of the upper roll project into the spaces between the saw tooth discs of the lower roll to form restricted passages therebetween, and said upper roll being rotatable at a lower speed than said lower roll and in a direction to kick excess fibrous material away from the restricted passages, a rotatable brush roll in parallel adjacent relationship to the lower roll for doffing the fibrous material from the lower roll into a passage extending downwardly and then upwardly, said passage having a perforated member disposed at the bottom thereof, said perforated member being in substantial alignment with and in juxtaposition to the rotatable brush roll to cause said rotatable brush roll to directly impinge the doffed material against the perforated member with increased velocity and the heavy contaminants pass therethrough and are separated from the opened and dispersed material, and exit means for the upwardly extending portion of the passage through which the opened, dispersed and cleaned fibrous material is passed from the apparatus.

References Cited in the file of this patent

UNITED STATES PATENTS

| Number | Name | Date |
|---|---|---|
| 354,432 | Moore | Dec. 14, 1886 |
| 661,166 | Boyd | Nov. 6, 1900 |
| 1,002,131 | Broome | Aug. 29, 1911 |
| 1,233,514 | Scott | July 17, 1917 |
| 1,680,978 | Garner | Aug. 14, 1928 |
| 1,713,371 | Brennen | May 14, 1929 |
| 1,751,306 | Cumpston | Mar. 18, 1930 |
| 2,014,947 | McCulloch et al. | Sept. 17, 1935 |
| 2,055,630 | McLean | Sept. 29, 1936 |
| 2,072,978 | Cumpston | Mar. 9, 1937 |
| 2,218,338 | Manning | Oct. 15, 1940 |
| 2,239,059 | Schwartz et al. | Apr. 22, 1941 |
| 2,274,385 | Schwartz et al. | Feb. 24, 1942 |